May 15, 1951     W. L. LARSON     2,552,726
FRICTION TYPE THROTTLE CONTROL
Filed May 18, 1948
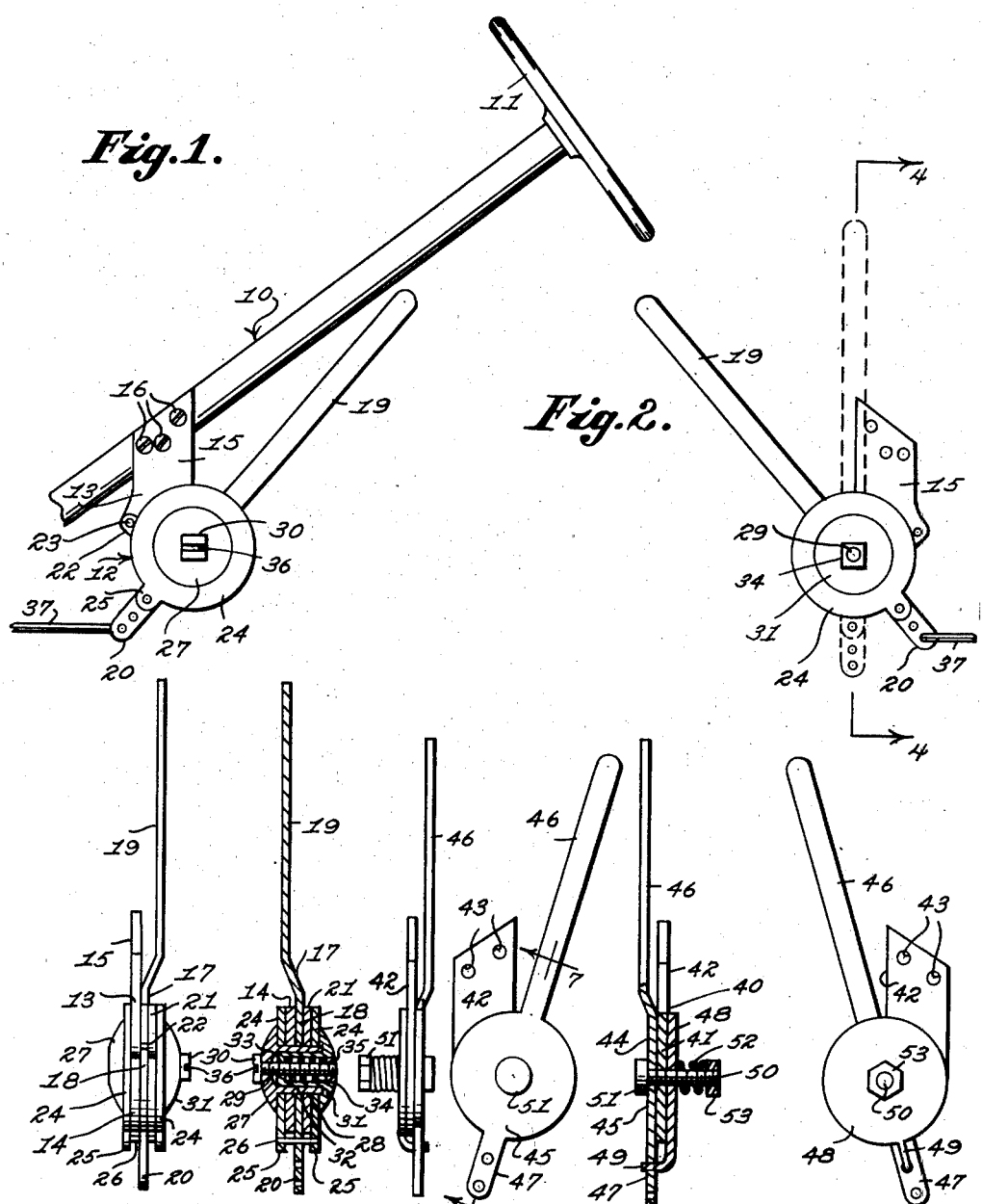
INVENTOR.
Walter L. Larson
BY
McMorrow, Berman & Davidson
ATTORNEYS Patented May 15, 1951

2,552,726

UNITED STATES PATENT OFFICE 2,552,726

FRICTION TYPE THROTTLE CONTROL

Walter L. Larson, Claflin, Kans.

Application May 18, 1948, Serial No. 27,660

2 Claims. (Cl. 74—531)

This invention relates to improvements in throttle control mechanisms and more particularly to an improved control mechanism having friction means for holding a throttle lever in adjusted position.

It is among the objects of the invention to provide an improved throttle control mechanism which has no teeth or notches for holding the throttle in adjusting position and hence provides for extremely fine adjustments of the throttle, which frictionally holds the throttle securely in adjusted position and precludes accidental movement thereof, which may be operatively mounted on various devices requiring throttle controls with no material modification of such devices and is particularly adapted for mounting on various types of tractors, and which is simple and durable in construction, economical to manufacture, and easy to install and operate.

Other objects and advantages will become apparent from a consideration of the following description and the appended claims in conjunction with the accompanying drawing, wherein:

Figure 1 is a longitudinal elevation of a vehicle steering column with a throttle control illustrative of the invention operatively mounted thereon;

Figure 2 is a longitudinal elevation of the opposite side of the throttle control from that illustrated in Figure 1;

Figure 3 is a longitudinal edge elevation of the throttle control illustrated in Figures 1 and 2;

Figure 4 is a longitudinal medial cross-section of the throttle control, taken substantially on the line 4—4 of Figure 2;

Figure 5 is a longitudinal edge elevation of a somewhat modified form of throttle control;

Figure 6 is a longitudinal side elevation of the modified throttle control illustrated in Figure 5;

Figure 7 is a longitudinal medial cross-section taken substantially on the line 7—7 of Figure 6; and Figure 8 is a longitudinal side elevation of the opposite side of the modified throttle control from that illustrated in Figure 6.

With continued reference to the drawing and particularly to Figures 1 to 4, inclusive, the numeral 10 generally indicates the steering column of a vehicle, such as a farm tractor, having on its upper end a steering wheel 11. The improved throttle control, generally indicated at 12, has a bracket 13 which includes a centrally-apertured disk portion 14 and an arm 15 projecting radially from the disk portion and provided adjacent its outer end with apertures which receive suitable screw fasteners 16 by means of which the bracket is rigidly secured to a fixed support such as the steering column 10 of a vehicle.

The throttle lever 17 has a centrally-apertured disk portion 18 from which radially projects an elongated handle 19 and an apertured arm 20 angularly spaced from the handle, the angle between the handle and the arm being determined by the particular operating conditions of the control mechanism. The disk portion 18 of the lever 17 has one flat side thereof in contact with the adjacent flat side of the disk portion 14 of bracket 13 and the central apertures of the two disk portions are in alignment with each other. A centrally-apertured friction disk 21 is disposed at the opposite side of the disk of lever 17 from the bracket disk 14 and this disk 21 is provided with an outwardly-projecting apertured lug 22 which receives a pin 23 extending through a corresponding aperture in bracket arm 15 to secure the disk 21 against rotation relative to the bracket. A pair of centrally-apertured friction disks 24 are disposed one at each outer side of the assembly including the bracket 13, lever 17 and disk 21 and these two disks 24 are provided with outwardly-extending apertured lugs 25 which receive the ends of a pin 26 which passes through a corresponding aperture in throttle lever arm 20 to co-rotationally connect the disks 24 to the throttle lever.

A first hollow cylindrical hub member 28 extends through the central apertures in the disks of the bracket and lever and friction disks 21 and 24 and has a centrally apertured, circular head 27 bearing against one outer side of the disk assembly. A second hollow cylindrical hub 32 is telescopically received within the first hub 28, has a centrally apertured head 31 bearing against the opposite outer side of the disk assembly and is provided at its end remote from head 31 with an internal shoulder 33. The interior of the hollow, cylindrical hub 32 of washer 31 is made non-circular in cross-sectional shape for a purpose which will presently appear.

A coiled compression spring 34 is disposed within the hub 32 and bears at one end on the internal shoulder 33. A bolt 29 extends through the hubs and the spring 34 and has on one end a head 30 bearing against the outer side of the head 27 of the first hub 28. A nut 35 is threaded onto bolt 29 within the central aperture of head 31 of hub 32 and bears on the opposite end of spring 34 to compress the spring and thereby resiliently urge the heads 29 and 31 toward each other to apply friction inducing pressure to the disks 24 and 21, the bracket 13 and the throttle lever 17.

Nut 35 is non-rotatable in the non-circular interior of hub 32 so that the nut can be threaded on the bolt by turning the bolt by a suitable tool, such as a screw-driver, inserted in the slot 36 in the head of the bolt.

When the control mechanism is assembled, as described above, and the bracket arm 15 rigidly attached to a suitable support, the handle 19 may be moved about the axis of the central aperture in the disk portion thereof and will be firmly held in any adjusted position by the frictional clamping action of the assembly. The throttle rod 37 is connected at one end to the throttle lever arm 20 in a conventional manner as by having an outwardly-turned end portion of the throttle rod inserted through an aperture in the apertured throttle lever arm.

The modified mechanism illustrated in Figures 5, 6, 7, and 8, is somewhat simpler than the mechanism above described and is applicable in certain installations where a large amount of friction is not required. It is to be understood that the amount of friction can be varied by changing the size of the various friction disks and disk portions, the strength of the compression spring and the number of auxiliary friction disks used in the assembly.

In the modified arrangement the bracket 40 has a centrally-apertured disk portion 41 from which the attaching arm 42 radially projects. Arm 42 is provided in its outer end with suitable apertures 43 for screw-fasteners or similar elements for attaching the mechanism to a fixed fitting of the device on which it is installed. The throttle lever 44 has a centrally-apertured disk 45 from which radially project the elongated handle 46 and an apertured arm 47 to which the throttle rod is operatively connected. The throttle lever is disposed with one flat side of its centrally-apertured disk portion against the adjacent flat side of the centrally-apertured disk portion 41 of bracket 40 and a centrally-apertured friction disk 48 is disposed against the opposite flat side of the bracket disk portion. Friction disk 48 has an outwardly-extending, bent-over tongue 49 which extends through an aperture in the arm 47 of the throttle lever to co-rotationally connect the friction disk and the lever.

A bolt 50 extends through the central apertures in the disk portions of the throttle lever and bracket and the friction disk 48 and has on one end a head 51 bearing against one outer side of this assembly. A compression spring 52 surrounds the bolt and bears at one end against the opposite side of the assembly and a nut 53 is threaded onto the bolt to compress the spring and force the throttle lever, bracket and friction disk assembly into frictional engagement with each other.

With the modified mechanism also, the throttle lever may be adjusted by the handle 46 and will be firmly maintained in adjusted position by the friction between the disk portions of the throttle lever and bracket and the friction disk 48.

The invention may be embodied in other specific forms without departing from the spirit or essential characteristics thereof. The present embodiments, are, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. A manually operated control means comprising a bracket including a centrally apertured disk and an arm extending radially from said disk and provided near its outer end with apertures for attaching said bracket to a fixed support, a lever including a centrally apertured disk portion disposed against one side of the bracket disk substantially concentric with the latter, a handle extending radially from the lever disk and an apertured control arm projecting radially from said lever disk at a location angularly spaced from said handle, a centrally apertured friction disk disposed at the opposite side of said lever disk from said bracket disk and substantially concentric with said bracket disk, means connecting said bracket and said friction disks to hold said friction disk against rotation relative to said bracket, a pair of centrally apertured friction disks respectively disposed at the side of said bracket disk opposite said lever disk and at the side of said friction disk opposite said lever disk, means connecting said pair of friction disks to said lever for co-rotation therewith, a bolt extending through the central apertures of said disks having a head disposed at one outer side of the friction disk assembly, a nut on said bolt, and a compression spring surrounding said bolt between said nut and the adjacent outer side of said friction disk assembly to exert a compressive force on the disk assembly disposed between said spring and said bolt head.

2. A manually operated control means comprising a bracket including a centrally apertured disk and an arm extending radially from said disk and provided near its outer end with apertures for attaching said bracket to a fixed support, a lever including a centrally apertured disk portion disposed against one side of the bracket disk substantially concentric with the latter, a handle extending radially from the lever disk and an apertured control arm projecting radially from said lever disk at a location angularly spaced from said handle, a centrally apertured friction disk disposed at the opposite side of said lever disk from said bracket disk and substantially concentric with said bracket disk, means connecting said bracket and said friction disk to hold said friction disk against rotation relative to said bracket, a pair of centrally apertured friction disks respectively disposed at the side of said bracket disk opposite said lever disk and at the side of the first mentioned friction disk opposite said lever disk, means connecting said pair of friction disks to said lever for co-rotation therewith, a first hollow cylindrical hub extending through the central apertures of said disks and having at one end a centrally apertured head bearing against one outer side of the disk assembly, a second hollow cylindrical hub telescopically received in said first hub and having at one end a centrally apertured head bearing against the opposite outer side of the disk assembly, an internal annular shoulder at the end of said second hub opposite the corresponding head, a compression spring in said second hub bearing at one end against said internal shoulder, a bolt extending through said hubs and said spring and having on one end a head bearing against the head of said first hub, and a nut threaded on said bolt near the opposite end of the latter, said nut passing through the central aperture in the head of said second hub and bearing against the adjacent end of said spring to compress said disks into frictional engagement with each other, said first hub being out of contact with the head of said second hub.

WALTER L. LARSON.

REFERENCES CITED

The following references are of record in the file of this patent:

UNITED STATES PATENTS

| Number | Name | Date |
|---|---|---|
| 1,436,706 | Galamb | Nov. 28, 1922 |
| 1,736,691 | Aplin | Nov. 19, 1929 |
| 1,793,786 | Emmons | Feb. 24, 1931 |
| 2,197,290 | Baker | Apr. 16, 1940 |
| 2,373,225 | Clickner | Apr. 10, 1945 |
| 2,378,688 | Codlin | June 19, 1945 |
| 2,445,607 | DeGhetto | July 20, 1948 |

FOREIGN PATENTS

| Number | Country | Date |
|---|---|---|
| 72,652 | Norway | July 10, 1945 |